United States Patent
Ho et al.

(10) Patent No.: US 11,502,288 B2
(45) Date of Patent: Nov. 15, 2022

(54) METHOD OF PREPARING BATTERY ANODE SLURRIES

(71) Applicant: GRST International Limited, Hong Kong (HK)

(72) Inventors: Kam Piu Ho, Hong Kong (HK); Ranshi Wang, Hong Kong (HK); Peihua Shen, Guangdong (CN); Yingkai Jiang, Hong Kong (HK)

(73) Assignee: GRST International Limited, Hong Kong (HK)

( * ) Notice: Subject to any disclaimer, the term of this patent is extended or adjusted under 35 U.S.C. 154(b) by 991 days.

(21) Appl. No.: 16/314,393

(22) PCT Filed: Nov. 2, 2017

(86) PCT No.: PCT/CN2017/109079
§ 371 (c)(1),
(2) Date: Dec. 29, 2018

(87) PCT Pub. No.: WO2018/082601
PCT Pub. Date: May 11, 2018

(65) Prior Publication Data
US 2019/0260011 A1 Aug. 22, 2019

Related U.S. Application Data

(60) Provisional application No. 62/418,293, filed on Nov. 7, 2016.

(51) Int. Cl.
*H01M 4/13* (2010.01)
*H01M 4/62* (2006.01)
(Continued)

(52) U.S. Cl.
CPC ......... *H01M 4/1395* (2013.01); *H01M 4/133* (2013.01); *H01M 4/1393* (2013.01);
(Continued)

(58) Field of Classification Search
CPC .. H01M 4/1395; H01M 4/1393; H01M 4/621; H01M 4/625
See application file for complete search history.

(56) References Cited

U.S. PATENT DOCUMENTS

| | | | | |
|---|---|---|---|---|
| 2010/0285359 A1* | 11/2010 | Hwang | ................ | H01M 4/133 429/219 |
| 2011/0043966 A1* | 2/2011 | Kobayashi | ............ | H01G 11/12 252/511 |

(Continued)

FOREIGN PATENT DOCUMENTS

| | | |
|---|---|---|
| CN | 104282881 A | 1/2015 |
| CN | 104617280 A | 5/2015 |

(Continued)

OTHER PUBLICATIONS

English Translation of CN 105304858 (Year: 2015).*
(Continued)

*Primary Examiner* — Ula C Ruddock
*Assistant Examiner* — Frank A Chernow

(57) ABSTRACT

Provided herein is a method of preparing anode slurries of lithium-ion batteries. The silicon-based material is uniformly dispersed prior to mixing with other components of the anode slurry. The method disclosed herein is capable of avoiding agglomeration of nano-sized silicon-based material and effectively dispersing the nano-sized silicon-based material uniformly in anode slurries. Anodes coated with the anode slurries disclosed herein also show an improvement in the electrical conductivity.

19 Claims, 1 Drawing Sheet

(51) Int. Cl.
  *H01M 4/1395* (2010.01)
  *H01M 4/1393* (2010.01)
  *H01M 10/0525* (2010.01)
  *H01M 4/133* (2010.01)

(52) U.S. Cl.
  CPC .......... *H01M 4/621* (2013.01); *H01M 4/624* (2013.01); *H01M 4/625* (2013.01); *H01M 10/0525* (2013.01)

(56) References Cited

U.S. PATENT DOCUMENTS

| | | | | |
|---|---|---|---|---|
| 2013/0212875 | A1* | 8/2013 | Takahata | H01M 4/04 29/623.5 |
| 2014/0170498 | A1* | 6/2014 | Park | B82Y 30/00 429/218.1 |

FOREIGN PATENT DOCUMENTS

| | | |
|---|---|---|
| CN | 104752696 A | 7/2015 |
| CN | 105304858 A | 2/2016 |
| CN | 105336937 A | 2/2016 |
| CN | 106058156 A | 10/2016 |
| JP | 2015053152 A | 3/2015 |

OTHER PUBLICATIONS

Search Report of European Patent Application No. 17868267.0 dated Jun. 12, 2020.
Search Report of Singaporean Patent Application No. 11201911713P dated Jul. 14, 2020.
International Search Report of PCT Patent Application No. PCT/CN2017/109079 dated Jan. 26, 2018.

* cited by examiner

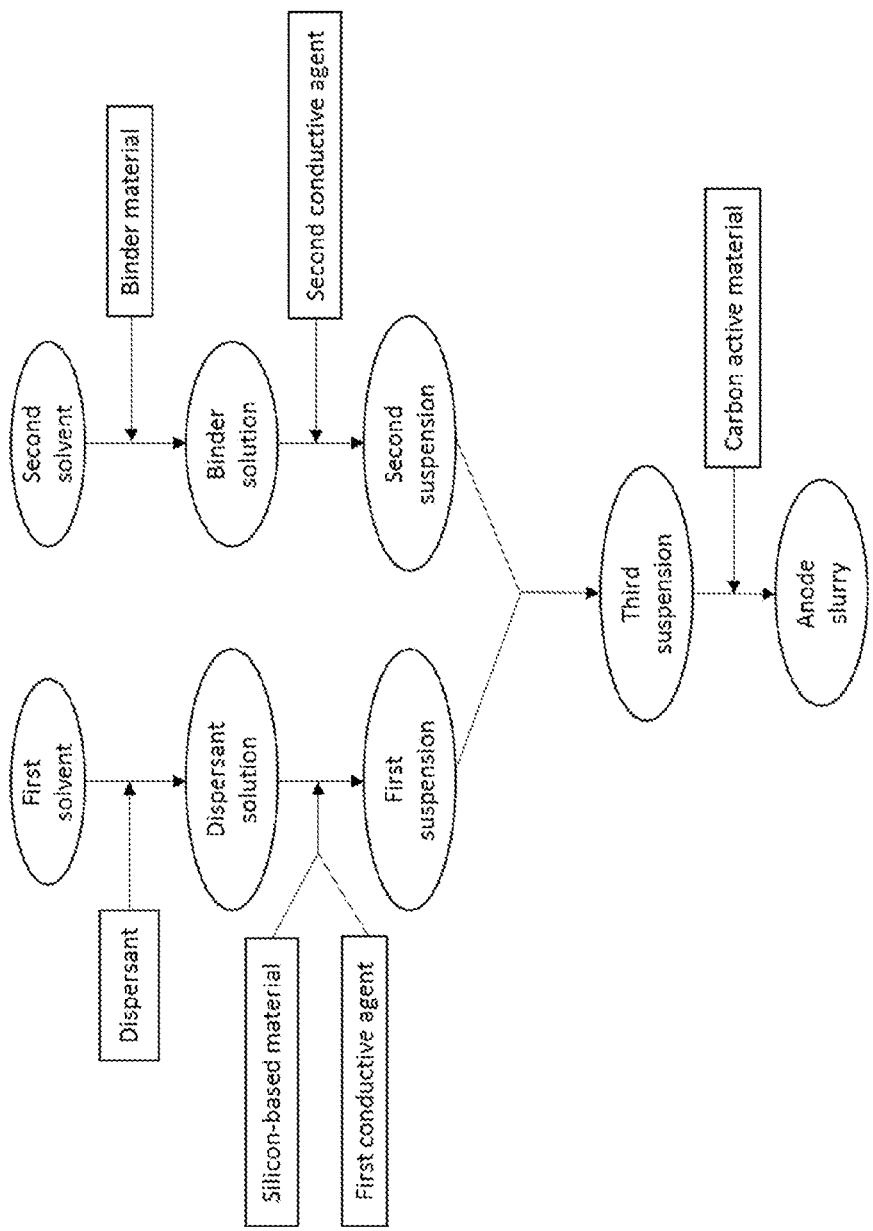

METHOD OF PREPARING BATTERY ANODE SLURRIES

FIELD OF THE INVENTION

The present invention relates to the field of batteries. In particular, this invention relates to methods for preparing anode slurries of lithium-ion batteries.

BACKGROUND OF THE INVENTION

Lithium-ion batteries (LIBs) have attracted extensive attention in the past two decades for a wide range of applications in portable electronic devices such as cellular phones and laptop computers. Due to rapid market development of electric vehicles (EV) and grid energy storage, high-performance, low-cost LIBs are currently offering one of the most promising options for large-scale energy storage devices.

Characteristics of electrodes can dramatically affect performance and safety characteristics of a battery. An anode of a conventional lithium-ion battery mainly includes a carbon-based anode material, such as mesocarbon microbeads and artificial graphite. The storage capacity of conventional lithium-ion batteries is limited since the full specific capacity of a carbon-based anode material has a theoretical value of 372 mAh/g. Compared to the carbon-based anode material, a silicon-containing anode material has a high theoretical specific capacity of about 4,000 mAh/g.

However, silicon-based anodes suffer from poor cycle life. During charge and discharge of the lithium-ion battery, lithium ions undergo intercalation and de-intercalation on the silicon-containing anode material, which results in volumetric expansion and contraction of the silicon-containing anode material. The resulting stresses tend to cause cracking in the anode layer, which in turn causes the anode materials to fall away from the electrode and a decrease in the service life of the lithium-ion battery. The cracking problem becomes more severe when aggregates of silicon particles are present in the anode. Therefore, preparation of the anode slurries is an essential first step towards the production of good quality batteries.

CN Patent Application Publication No. 104617280 A discloses an adhesive-free graphene/silicon electrode. The electrode is prepared by adding silicon powder and a surfactant to deionized water to obtain a mixture; dispersing the mixture by ultrasonication; adding graphene colloid to the mixture; dispersing the mixture by ultrasonication to obtain a slurry; and coating the slurry onto a copper foil. However, the method is complicated as it involves steps of introducing functional groups to graphene and the surface of the copper foil.

CN Patent Application Publication No. 105336937 A discloses an anode slurry for lithium-ion batteries and a preparation method thereof. The method comprises adding nano-silicon powder to ethylene glycol to obtain a dispersing solution; homogenizing the dispersing solution by ultrasonication; adding a binder, graphite powder and conductive agent to a solvent to obtain a mixed slurry; adding the dispersing solution in several portions to the mixed slurry; and homogenizing the mixture to obtain the anode slurry. However, this method is complicated and time consuming because it involves cooling the dispersing solution during ultrasonication to prevent overheating and portionwise addition of the dispersing solution to the mixed slurry.

CN Patent Application Publication No. 104282881 A discloses an anode and a preparation method thereof. The method comprises preparing a binder solution by dissolving polyimide in an organic solvent comprising at least one solvent selected from N-methyl-2-pyrrolidone (NMP), dimethylacetamide (DMAC), and dimethylformamide (DMF); adding a conductive agent to the binder solution to obtain a conductive liquid; adding a silicon anode material to the conductive liquid to form a mixture; and adding a carbon material and NMP to the mixture to obtain a slurry. However, this method is not suitable for application to binders other than polyimide.

An anode slurry containing a uniformly dispersed silicon-based material would be highly desirable for battery performance. In view of the above, there is a need for a continuous improvement of the methods for preparing anode slurries containing uniformly dispersed silicon-based material.

SUMMARY OF THE INVENTION

The aforementioned needs are met by various aspects and embodiments disclosed herein.

In one aspect, provided herein is a method of preparing an anode slurry, comprising the steps of:

1) mixing a dispersant with a first solvent to form a dispersant solution;

2) dispersing a silicon-based material and a first conductive agent in the dispersant solution to form a first suspension;

3) homogenizing the first suspension by a homogenizer to obtain a homogenized first suspension;

4) mixing a binder material with a second solvent to form a binder solution;

5) dispersing a second conductive agent in the binder solution to form a second suspension;

6) mixing the homogenized first suspension with the second suspension to form a third suspension; and 7) mixing a carbon active material with the third suspension to form the anode slurry;

wherein the particle size of the first conductive agent is smaller than the particle size of the second conductive agent.

In some embodiments, the dispersant is selected from the group consisting of polyvinyl alcohol, polyethylene oxide, polypropylene oxide, polyvinyl pyrrolidone, polyanionic cellulose, carboxylmethyl cellulose, hydroxyethylcellulose, carboxymethyl hydroxyethyl cellulose, methyl cellulose, starch, pectin, polyacrylamide, gelatin, polyacrylic acid, and combinations thereof. In certain embodiments, the viscosity of the dispersant solution is from about 10 cps to about 2,000 cps.

In certain embodiments, each of the first and second solvents is independently selected from the group consisting of water, ethanol, isopropanol, methanol, acetone, n-propanol, t-butanol, N-methyl-2-pyrrolidone, and combinations thereof.

In some embodiments, the silicon-based material is selected from the group consisting of Si, $SiO_x$, Si/C, $SiO_x/C$, Si/M, and combinations thereof, wherein each x is independently from 0 to 2; M is selected from an alkali metal, an alkaline-earth metal, a transition metal, a rare earth metal, or a combination thereof, and is not Si. In some embodiments, the particle size of the silicon-based material is from about 10 nm to about 800 nm.

In certain embodiments, the first conductive agent is selected from the group consisting of carbon, carbon black, acetylene black, Super P, graphene, graphene nanoplatelets, carbon fibres, carbon nano-fibers, graphitized carbon flake, carbon tubes, carbon nanotubes, activated carbon, mesoporous carbon, and combinations thereof. In certain embodiments, the particle size of the first conductive agent is from about 20 nm to about 100 nm.

In some embodiments, the particle size distribution of the first suspension has a D10 value in a range from about 10 nm to about 100 nm, a D50 value in a range from about 30 nm to about 2 μm, and a D90 value in a range from about 70 nm to about 3 μm.

In certain embodiments, the D90/D50 ratio of the particle size distribution is less than 2:1.

In some embodiments, the second conductive agent is selected from the group consisting of carbon, conductive graphite, vapor-grown carbon fiber, KS6, KS15, expanded graphite and combinations thereof. In certain embodiments, the particle size of the second conductive agent is from about 1 μm to about 10 μm. In some embodiments, the weight ratio of the first conductive agent to the second conductive agent is from about 5:1 to about 1:1.

In some embodiments, the carbon active material is selected from the group consisting of hard carbon, soft carbon, graphite, mesocarbon microbeads, and combinations thereof. In certain embodiments, the particle size of the carbon active material is from about 1 μm to about 20 μm.

In certain embodiments, the ratio of the particle size of the second conductive agent to particle size of the first conductive agent is from about 20:1 to about 250:1.

In some embodiments, the weight ratio of the silicon-based material to the first conductive agent is from about 1.7:1 to about 5:1.

In certain embodiments, the weight ratio of the first conductive agent to the second conductive agent is from about 1:1 to about 2:1.

In some embodiments, the amount of the silicon-based material is from about 1% to about 20% by weight, based on the total weight of the solid content in the anode slurry.

In certain embodiments, the amount of the first conductive agent and second conductive agent in the anode slurry is greater than or equal to 3% by weight, based on the total weight of solid content in the anode slurry.

In some embodiments, the anode slurry has a solid content of about 30% to about 65% by weight, based on the total weight of the anode slurry.

BRIEF DESCRIPTION OF THE DRAWINGS

FIG. 1 depicts an embodiment of the method disclosed herein.

DETAILED DESCRIPTION OF THE INVENTION

In one aspect, provided herein is a method of preparing an anode slurry, comprising the steps of:
1) mixing a dispersant with a first solvent to form a dispersant solution;
2) dispersing a silicon-based material and a first conductive agent in the dispersant solution to form a first suspension;
3) homogenizing the first suspension by a homogenizer to obtain a homogenized first suspension;
4) mixing a binder material with a second solvent to form a binder solution;
5) dispersing a second conductive agent in the binder solution to form a second suspension;
6) mixing the homogenized first suspension with the second suspension to form a third suspension; and
7) mixing a carbon active material with the third suspension to form the anode slurry;

wherein the particle size of the first conductive agent is smaller than the particle size of the second conductive agent.

The term "electrode" refers to a "cathode" or an "anode".

The term "positive electrode" is used interchangeably with cathode. Likewise, the term "negative electrode" is used interchangeably with anode.

The term "planetary mixer" refers to an equipment that can be used to mix or stir different materials for producing a homogeneous mixture, which consists of blades conducting a planetary motion within a vessel. In some embodiments, the planetary mixer comprises at least one planetary blade and at least one high speed dispersion blade. The planetary and the high speed dispersion blades rotate on their own axes and also rotate continuously around the vessel. The rotation speed can be expressed in unit of rotations per minute (rpm) which refers to the number of rotations that a rotating body completes in one minute.

The term "dispersant" refers to a chemical that can be used to promote uniform and maximum separation of fine particles in a suspending medium and form a stable suspension.

The term "dispersing" refers to an act of distributing a chemical species or a solid more or less evenly throughout a fluid.

The term "silicon-based material" refers to a material consisting of silicon or a combination of silicon and other elements.

The term "conductive agent" refers to a material which is chemically inactive and has good electrical conductivity. Therefore, the conductive agent is often mixed with an electrode active material at the time of forming an electrode to improve electrical conductivity of the electrode.

The term "homogenizer" refers to an equipment that can be used for homogenization of materials. The term "homogenization" refers to a process of reducing a substance or material to small particles and distributing it uniformly throughout a fluid. Any conventional homogenizers can be used for the method disclosed herein. Some non-limiting examples of the homogenizer include stirring mixers, blenders, mills (e.g., colloid mills and sand mills), ultrasonicators, atomizers, rotor-stator homogenizers, and high pressure homogenizers.

The term "ultrasonicator" refers to an equipment that can apply ultrasonic energy to agitate particles in a sample. Any ultrasonicator that can disperse the slurry disclosed herein can be used herein. Some non-limiting examples of the ultrasonicator include an ultrasonic bath, a probe-type ultrasonicator, and an ultrasonic flow cell.

The term "ultrasonic bath" refers to an apparatus through which the ultrasonic energy is transmitted via the container's wall of the ultrasonic bath into the liquid sample.

The term "probe-type ultrasonicator" refers to an ultrasonic probe immersed into a medium for direct sonication. The term "direct sonication" means that the ultrasound is directly coupled into the processing liquid.

The term "ultrasonic flow cell" or "ultrasonic reactor chamber" refers to an apparatus through which sonication processes can be carried out in a flow-through mode. In some embodiments, the ultrasonic flow cell is in a single-pass, multiple-pass or recirculating configuration.

The term "binder material" refers to a chemical or a substance that can be used to hold the active battery electrode material and conductive agent in place.

The term "carbon active material" refers to an active material having carbon as a main skeleton, into which lithium ions can be intercalated. Some non-limiting examples of the carbon active material include a carbonaceous material and a graphitic material. The carbonaceous material is a carbon material having a low degree of graphitization (low crystallinity). The graphitic material is a material having a high degree of crystallinity.

The term "particle size D50" refers to a volume-based accumulative 50% size (D50) which is a particle size at a point of 50% on an accumulative curve (i.e., a diameter of a particle in the 50th percentile (median) of the volumes of particles) when the accumulative curve is drawn so that a particle size distribution is obtained on the volume basis and the whole volume is 100%. Furthermore, D10 means a volume-based accumulative 10% size (i.e., a diameter of a particle in the 10th percentile of the volumes of particles), and D90 means a volume-based accumulative 90% size (i.e., a diameter of a particle in the 90th percentile of the volumes of particles).

The term "solid content" refers to the amount of non-volatile material remaining after evaporation.

The term "major component" of a composition refers to the component that is more than 50%, more than 55%, more than 60%, more than 65%, more than 70%, more than 75%, more than 80%, more than 85%, more than 90%, or more than 95% by weight or volume, based on the total weight or volume of the composition.

The term "minor component" of a composition refers to the component that is less than 50%, less than 45%, less than 40%, less than 35%, less than 30%, less than 25%, less than 20%, less than 15%, less than 10%, or less than 5% by weight or volume, based on the total weight or volume of the composition.

The term "C-rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or the full energy in 10 hours; and a 5 C means utilization of the full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3,600 coulombs of electrical charge. Similarly, the term "miniampere-hour (mAh)" also refers to a unit of the storage capacity of a battery and is $1/1,000$ of an ampere-hour.

The term "milliampere-hour per gram (mAh/g)" refers to a unit specifying the specific capacity of a battery material (i.e., the capacity per unit mass of the battery material).

The term "battery cycle life" refers to the number of complete charge/discharge cycles a battery can perform before its nominal capacity falls below 80% of its initial rated capacity.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

A conventional method of preparing a silicon-containing anode slurry includes the steps of adding a carbon active material such as graphite particles into a binder solution to form a mixture, and then adding silicon particles and a conductive agent into the mixture to form the silicon-containing anode slurry. However, the silicon particles tend to form aggregates which are held together by strong forces and will not easily break apart under normal dispersion conditions. The aggregates of the silicon particles tend to cause a problem of cracking of the silicon-containing anode during intercalation of the lithium ions.

What is needed in the industry is a method of preparing a silicon-containing anode slurry comprising uniformly dispersed silicon therein. The present invention relates to anode slurries having improved dispersibility of a silicon-based material, an anode active material and conductive agents.

FIG. 1 shows an embodiment of the method disclosed herein. First, a dispersant solution is prepared by mixing a dispersant with a first solvent. A silicon-based material and a first conductive agent are then dispersed in the dispersant solution to form a first suspension. The first suspension is then homogenized so as to thoroughly disperse the silicon-based material and first conductive agent in the first suspension. A binder solution is prepared by mixing a binder material with a second solvent. A second conductive agent is dispersed in the binder solution to form a second suspension. The homogenized first suspension is then mixed with the second suspension to form a third suspension. Finally, a carbon active material is added to the third suspension. The silicon-based material, carbon active material and the conductive agents together with the binder material form a silicon-containing anode slurry.

Due to the tendency of the nano-sized silicon-based material to stick to one another or to other components, it is important to disperse the silicon-based material uniformly prior to mixing with other components of the anode slurry. The method of the present invention is capable of avoiding agglomeration of nano-sized silicon-based material and effectively dispersing the nano-sized silicon-based material uniformly in anode slurries. A first suspension having homogeneous distribution of silicon-based material and first conductive agent is crucial to producing an anode slurry having homogeneous distribution of all the components in the anode slurry.

Also, preparing a second suspension having a homogeneous distribution of second conductive agent and/or carbon active material before mixing with the first suspension can ensure a homogeneous distribution of materials in the third suspension. As a result, the anode slurry prepared from the third suspension has a homogeneous distribution of materials.

The first conductive agent can increase the density of an electrode coating layer. An anode coating layer composed of particles with different sizes can effectively increase the packing density. The medium size particles would fill into the voids between the larger size particles whereas the smaller size particles would fill into the voids between the medium size particles. This successive filling of the voids by smaller size particles would reduce the volume of voids and increase the packing density of the anode coating layer. This will accordingly increase the packing density and cell capacity. Besides, as the electrical conductivity of silicon is lower than the electrical conductivity of carbon, an anode coating layer having conductive agents with different particle size has a well-connected conductive network, thereby increasing the electrical conductivity of anode coating layer.

However, as silicon-based material has a large volume change during intercalation and de-intercalation of lithium-ions, insufficient void volume in the anode coating layer will cause the cracking of the layer. One of the advantages of the present invention is that the anode slurry prepared by the method disclosed herein can be used to prepare an anode coating layer with increased electrical conductivity and sufficient space for the expansion of silicon-based material.

In certain embodiments, the dispersant solution is prepared by mixing a dispersant with a first solvent. In some embodiments, the dispersant is an acrylate-based or a cellulose-based polymer. Some non-limiting examples of the acrylic-based polymer include polyvinyl pyrrolidone, polyacrylic acid, and polyvinyl alcohol. Some non-limiting examples of the cellulose-based polymer include hydroxyethyl cellulose (HEC), hydroxypropyl cellulose (HPC), methyl cellulose (MC), and hydroxyalkyl methyl cellulose. In further embodiments, the dispersant is selected from the group consisting of polyvinyl alcohol, polyethylene oxide, polypropylene oxide, polyvinyl pyrrolidone, polyanionic cellulose, carboxylmethyl cellulose, hydroxyethyl cellulose, carboxymethyl hydroxyethyl cellulose, methyl cellulose, starch, pectin, polyacrylamide, gelatin, polyacrylic acid, and combinations thereof.

The use of the dispersant enhances wetting of the silicon-based material and helps the silicon-based material disperse in the dispersant solution. The addition of surfactants such as an anionic surfactant or a cationic surfactant, however, tends to change other physical properties of the dispersion solution (such as surface tension), and may render the dispersion solution unsuitable for a desired application. Additionally, the use of the dispersant may also help inhibit the settling of solid contents by increasing the viscosity of the dispersion solution. Therefore, constant viscosities in the dispersion solution and a uniform dispersion state may be retained for a long time.

The solvent used in the anode slurry can be any polar organic solvent. In certain embodiments, each of the first and second solvents independently is a polar organic solvent selected from the group consisting of methyl propyl ketone, methyl isobutyl ketone, ethyl propyl ketone, diisobutyl ketone, acetophenone, N-methyl-2-pyrrolidone, acetone, tetrahydrofuran, dimethylformamide, acetonitrile, dimethyl sulfoxide, and the like.

An aqueous solvent can also be used for producing the anode slurry. Transition to an aqueous-based process may be desirable to reduce emissions of volatile organic compound, and increase processing efficiency. In certain embodiments, each of the first and second solvents independently is a solution containing water as the major component and a volatile solvent, such as alcohols, lower aliphatic ketones, lower alkyl acetates or the like, as the minor component in addition to water. In some embodiments, the amount of water is at least 50%, at least 55%, at least 60%, at least 65%, at least 70%, at least 75%, at least 80%, at least 85%, at least 90%, or at least 95% to the total amount of water and solvents other than water. In certain embodiments, the amount of water is at most 55%, at most 60%, at most 65%, at most 70%, at most 75%, at most 80%, at most 85%, at most 90%, or at most 95% to the total amount of water and solvents other than water. In some embodiments, the solvent consists solely of water, that is, the proportion of water in the solvent is 100 vol. %.

Any water-miscible solvents can be used as the minor component of the first or second solvents. Some non-limiting examples of the minor component (i.e., solvents other than water) include alcohols, lower aliphatic ketones, lower alkyl acetates and combinations thereof. Some non-limiting examples of the alcohol include $C_1$-$C_4$ alcohols, such as methanol, ethanol, isopropanol, n-propanol, butanol, and combinations thereof. Some non-limiting examples of the lower aliphatic ketones include acetone, dimethyl ketone, and methyl ethyl ketone. Some non-limiting examples of the lower alkyl acetates include ethyl acetate, isopropyl acetate, and propyl acetate.

In certain embodiments, each of the first and second solvents is free of an organic solvent such as alcohols, lower aliphatic ketones, and lower alkyl acetates. Since the composition of the anode slurry does not contain any organic solvent, expensive, restrictive and complicated handling of organic solvents is avoided during the manufacture of the slurry.

The amount of the dispersant in the dispersant solution ranges from about 0.01% to about 15%, from about 0.01% to about 10%, or from about 0.1% to about 8% by weight, based on the total weight of the dispersant solution. When the amount of the dispersant is too high, the weight ratio of dispersant per weight of the active material is increased, and thus the amount of the active material is reduced. This results in the reduction of a cell capacity and the deterioration of cell properties.

In certain embodiments, the viscosity of the dispersant solution is from about 10 cps to about 2,000 cps, from about 20 cps to about 1,000 cps, from about 50 cps to about 1,000 cps, from about 100 cps to about 1,000 cps, from about 200 cps to about 1,000 cps, from about 500 cps to about 1,000 cps, from about 20 cps to about 800 cps, from about 20 cps to about 500 cps, from about 20 cps to about 200 cps, from about 20 cps to about 100 cps, or from about 20 cps to about 50 cps.

The anode slurry disclosed herein comprises a silicon-based material to increase the storage capacity of the batteries. A silicon-based material and a first conductive agent are dispersed in the dispersant solution to form a first suspension. In certain embodiments, the silicon-based material is selected from the group consisting of Si, $SiO_x$, Si/C, $SiO_x$/C, Si/M, and combinations thereof, wherein each x is independently from 0 to 2; M is selected from an alkali metal, an alkaline-earth metal, a transition metal, a rare earth metal, or a combination thereof, and is not Si.

There is no particular restriction on the type of the silicon-based material. The silicon-based material can be prepared in the form of a fine powder, nano-wire, nano-rod, nano-fiber, or nano-tube. In certain embodiments, the silicon-based material is in the form of fine powder. When the particle size of the silicon-based material is too large (e.g., larger than 800 nm), the silicon-based material will undergo a very large volume expansion, thereby causing cracking of the anode coating layer. In some embodiments, the particle size of the silicon-based material is from about 10 nm to about 800 nm, from about 10 nm to about 500 nm, from about 10 nm to about 300 nm, from about 10 nm to about 100 nm, from about 30 nm to about 500 nm, from about 30 nm to about 300 nm, from about 30 nm to about 100 nm, from about 50 nm to about 300 nm, from about 50 nm to about 100 nm, or from about 100 nm to about 300 nm. In certain embodiments, the particle size of the silicon-based material is less than 800 nm, less than 600 nm, less than 400 nm, less than 200 nm, or less than 100 nm. In some embodiments, the particle size of the silicon-based material is greater than 10 nm, greater than 50 nm, greater than 100 nm, greater than 200 nm, or greater than 500 nm.

In some embodiments, the weight ratio of the silicon-based material to the dispersant in the first suspension is from about 1:1 to about 10:1, from about 1:1 to about 8:1, from about 1:1 to about 6:1, from about 3:1 to about 10:1, from about 3:1 to about 8:1, from about 3:1 to about 6:1, or from about 4:1 to about 6:1. In certain embodiments, the weight ratio of the silicon-based material to the dispersant in the first suspension is less than 10:1, less than 8:1, less than 6:1, less than 4:1, or less than 2:1. In some embodiments, the weight ratio of the silicon-based material to the dispersant in the first suspension is greater than 2:1, greater than 4:1, greater than 6:1, or greater than 8:1.

The conductive agent in the anode slurry is for enhancing the electrically-conducting property of an anode. In some embodiments, the anode slurry comprises conductive agents of different sizes. In certain embodiments, the anode slurry comprises a first conductive agent and a second conductive agent, and the particle size of the first conductive agent is less than the particle size of the second conductive agent. In some embodiments, the first conductive agent is selected from the group consisting of carbon, carbon black, acetylene black, Super P, graphene, graphene nanoplatelets, carbon fibres, carbon nano-fibers, graphitized carbon flake, carbon tubes, carbon nanotubes, activated carbon, mesoporous carbon, and combinations thereof. In certain embodiments, the first conductive agent is not carbon, carbon black, acetylene black, Super P, graphene, graphene nanoplatelets, carbon fibres, carbon nano-fibers, graphitized carbon flake, carbon tubes, carbon nanotubes, activated carbon, or mesoporous carbon.

In some embodiments, the particle size of the first conductive agent is from about 20 nm to about 100 nm, from about 20 nm to about 80 nm, from about 30 nm to about 70 nm, from about 30 nm to about 50 nm, from about 40 nm to about 100 nm, from about 40 nm to about 60 nm, from about 45 nm to about 90 nm, from about 45 nm to about 60 nm, or from about 60 nm to about 100 nm. In some embodiments, the particle size of the first conductive agent is less than 100 nm, less than 80 nm, less than 60 nm, less than 40 nm, or less than 20 nm. In certain embodiments, the particle size of the first conductive agent is greater than 20 nm, greater than 40 nm, greater than 60 nm, or greater than 80 nm.

In certain embodiments, the aspect ratio of each of the first conductive agent and second conductive agent is independently from about 1:1 to about 1:10, from about 1:1 to about 1:8, from about 1:1 to about 1:6, from about 1:1 to about 1:5, or from about 1:1 to about 1:3. In some embodiments, the aspect ratio of each of the first conductive agent and second conductive agent is independently less than 1:10, less than 1:8, less than 1:6, less than 1:5, or less than 1:3.

In some embodiments, the weight ratio of the first conductive agent to the dispersant in the first suspension is from about 0.5:1 to about 5:1, from about 0.5:1 to about 2.5:1, from about 1:1 to about 5:1, from about 1:1 to about 4:1, from about 1:1 to about 3:1, or from about 1:1 to about 2:1. In certain embodiments, the weight ratio of the first conductive agent to the dispersant in the first suspension is less than 5:1, less than 4:1, less than 3:1, less than 2:1, or less than 1:1. In some embodiments, the weight ratio of the first conductive agent to the dispersant in the first suspension is greater than 0.5:1, greater than 1:1, greater than 2:1, greater than 3:1, or greater than 4:1.

In certain embodiments, the weight ratio of the silicon-based material to the first conductive agent is from about 2 to about 5, from about 2 to about 4, from about 2 to about 3, from about 2.5 to about 5, from about 3 to about 5, from about 3 to about 4, or from about 4 to about 5.

In certain embodiments, the particle size distribution of the first suspension has a D10 value in a range from about 5 nm to about 100 nm, from about 5 nm to about 50 nm, from about 10 nm to about 100 nm, from about 10 nm to about 80 nm, from about 10 nm to about 60 nm, from about 10 nm to about 40 nm, from about 10 nm to about 20 nm, from about 30 nm to about 100 nm, or from about 50 nm to about 100 nm.

In some embodiments, the particle size distribution of the first suspension has a D50 value in a range from about 30 nm to about 1 µm, from about 30 nm to about 500 nm, from about 30 nm to about 300 nm, from about 30 nm to about 200 nm, from about 30 nm to about 100 nm, from about 30 nm to about 80 nm, from about 30 nm to about 60 nm, or from about 30 nm to about 50 nm.

In certain embodiments, the particle size distribution of the first suspension has a D90 value in a range from about 50 nm to about 1 µm, from about 50 nm to about 800 nm, from about 50 nm to about 500 nm, from about 50 nm to about 300 nm, from about 50 nm to about 100 nm, from about 70 nm to about 300 nm, from about 70 nm to about 200 nm, from about 70 nm to about 100 nm, or from about 70 nm to about 90 nm.

In some embodiments, each of the D50/D10 and D90/D50 ratios of the particle size distribution of the first suspension is independently from about 0.3:1 to about 10:1, from about 1:1 to about 10:1, from about 1:1 to about 5:1, from about 1:1 to about 3:1, from about 1:1 to about 2:1, from about 2:1 to about 5:1, from about 2:1 to about 4:1, or from about 1.5:1 to about 4:1. In certain embodiments, each of the D50/D10 and D90/D50 ratios of the particle size distribution of the first suspension is independently less than 10:1, less than 5:1, less than 4:1, less than 3:1, less than 2:1, less than 1.5:1, or less than 1:1. In some embodiments, each of the D50/D10 and D90/D50 ratios of the particle size distribution of the first suspension is independently greater than 1:1, greater than 2:1, greater than 3:1, greater than 4:1, or greater than 5:1.

In certain embodiments, the D90/D10 ratio of the particle size distribution of the first suspension is from about 2:1 to about 10:1, from about 2:1 to about 8:1, from about 2:1 to about 6:1, from about 2:1 to about 5:1, from about 4:1 to about 10:1, from about 4:1 to about 8:1, or from about 4:1 to about 6:1. In some embodiments, the D90/D10 ratio of the particle size distribution of the first suspension is less than 10:1, less than 8:1, less than 6:1, or less than 5:1. In certain embodiments, the D90/D10 ratio of the particle size distribution of the first suspension is greater than 2:1, greater than 3:1, greater than 4:1, greater than 5:1, or greater than 6:1.

In some embodiments, the first suspension has a solid content from about 3% to about 35%, from about 3% to about 30%, from about 3% to about 20%, from about 3% to about 15%, from about 3% to about 10%, from about 3% to about 5%, from about 5% to about 15%, from about 5% to about 10%, from about 10% to about 35%, from about 20% to about 35%, or from about 25% to about 35% by weight, based on the total weight of the first suspension.

The first suspension is then homogenized by a homogenizer to achieve uniform dispersion of the silicon-based material and the first conductive agent and obtain a homogenized first suspension. Any equipment that can homogenize the first suspension can be used herein. In some embodiments, the homogenizer is an ultrasonicator, a stirring mixer, planetary mixer, a blender, a mill, a rotor-stator homogenizer, or a high pressure homogenizer.

In some embodiments, the homogenizer is an ultrasonicator. Any ultrasonicator that can apply ultrasound energy to agitate and disperse particles in a sample can be used herein. In some embodiments, the ultrasonicator is an ultrasonic bath, a probe-type ultrasonicator, or an ultrasonic flow cell.

In certain embodiments, the ultrasonicator is operated at a power density from about 20 W/L to about 200 W/L, from about 20 W/L to about 150 W/L, from about 20 W/L to about 100 W/L, from about 20 W/L to about 50 W/L, from about 50 W/L to about 200 W/L, from about 50 W/L to about 150 W/L, from about 50 W/L to about 100 W/L, from about 10 W/L to about 50 W/L, or from about 10 W/L to about 30 W/L.

In some embodiments, the first suspension is sonicated for a time period from about 0.5 hour to about 5 hours, from about 0.5 hour to about 3 hours, from about 0.5 hour to about 2 hours, from about 1 hour to about 5 hours, from about 1 hour to about 3 hours, from about 1 hour to about 2 hours, from about 2 hours to about 5 hours, or from about 2 hours to about 4 hours.

In certain embodiments, the first suspension is homogenized by mechanical stirring for a time period from about 0.5 hour to about 5 hours. In some embodiments, the stirring mixer is a planetary mixer consisting of planetary and high speed dispersion blades. In certain embodiments, the rotational speed of planetary and high speed dispersion blades is the same. In other embodiments, the rotational speed of the planetary blade is from about 50 rpm to about 200 rpm and rotational speed of the dispersion blade is from about 1,000 rpm to about 3,500 rpm. In certain embodiments, the stirring time is from about 0.5 hour to about 5 hours, from about 1 hour to about 5 hours, from about 2 hours to about 5 hours, or from about 3 hours to about 5 hours.

In some embodiments, the first suspension is homogenized by mechanical stirring and ultrasonication simultaneously. In certain embodiments, the first suspension is ultrasonicated and stirred at room temperature for several hours. The combined effects of mechanical stirring and ultrasonication can enhance mixing effect. Hence, a homogenized first suspension could be obtained and the mixing time could be reduced. In certain embodiments, the time for stirring and ultrasonication is from about 0.5 hour to about 5 hours, from about 0.5 hour to about 4 hours, from about 0.5 hour to about 3 hours, from about 0.5 hour to about 2 hours, from about 0.5 hour to about 1 hour, from about 1 hour to about 4 hours, from about 1 hour to about 3 hours, or from about 1 hour to about 2 hours. In some embodiments, in order to ensure thorough mixing of materials in the first suspension, the time for stirring and ultrasonication is at least 1 hour or 2 hours.

During the operation of ultrasonicator, ultrasound energy is converted partially into heat, causing an increase in the temperature in the suspension. Conventionally, a cooling system is used for dissipating the heat generated. In order to maintain the suspension temperature during ultrasonication, a bath of ice may be used. Furthermore, a shorter duration for ultrasonication may be used to prevent overheating the suspension due to generation of large amounts of heat. The suspension can also be ultrasonicated intermittently to avoid overheating. However, when a higher power is applied, considerable amount of heat can be generated due to larger oscillation amplitude. Therefore, it becomes more difficult to cool the suspension.

The homogeneity of the silicon-based material and the first conductive agent in the first suspension depends on the ultrasound energy delivered to the suspension. The ultrasonic power cannot be too high as the heat generated by ultrasonication may overheat the suspension. A temperature rise during ultrasonication may affect the dispersion quality of particles in the first suspension.

The ultrasonicator can be operated at a low power density to avoid overheating of the first suspension. In some embodiments, the first suspension is treated by the ultrasonication at a power density of about 20 W/L to about 200 W/L with stirring at a rotational speed of the dispersion blade from about 1,000 rpm to about 3,500 rpm and rotational speed of the planetary blade from about 50 rpm to about 200 rpm. In other embodiments, the ultrasonicator is operated at a power density from about 20 W/L to about 150 W/L, from about 20 W/L to about 100 W/L, from about 20 W/L to about 50 W/L, from about 50 W/L to about 200 W/L, from about 50 W/L to about 150 W/L, from about 50 W/L to about 100 W/L, from about 10 W/L to about 50 W/L, or from about 10 W/L to about 30 W/L. In some embodiments, the ultrasonicator is operated at a power density less than 100 W/L, less than 80 W/L, less than 60 W/L, or less than 50 W/L. When such power densities are used, heat removal or cooling is not required for the dispersing step. In some embodiments, the rotational speed of the dispersion blade is from about 1,000 rpm to about 3,000 rpm, from about 1,000 rpm to about 2,000 rpm, from about 2,000 rpm to about 3,500 rpm, or from about 3,000 rpm to about 3,500 rpm. In certain embodiments, the rotational speed of the planetary blade is from about 50 rpm to about 150 rpm, from about 50 rpm to about 100 rpm, from about 75 rpm to about 200 rpm, from about 75 rpm to about 150 rpm, from about 100 rpm to about 200 rpm, or from about 100 rpm to about 150 rpm.

The first suspension prepared in the present invention shows homogeneous particle size distribution. If agglomeration of silicon-based material and first conductive agent occurs, the homogeneity of the particles in the first suspension will be affected, which will consequently affects the particle size distribution of anode slurry.

In some embodiments, a second suspension can be prepared by dispersing a second conductive agent in the binder solution.

The binder material in the anode slurry performs a role of binding the active electrode material and conductive agents together on the current collector. A binder solution can be prepared by mixing a binder material with a second solvent. In some embodiments, the binder material is selected from the group consisting of styrene-butadiene rubber (SBR), acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose (CMC), hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid (PAA), polyacrylate, polymethacrylic acid, polymethacrylate, polyacrylamide, polyurethane, fluorinated polymer, chlorinated polymer, a salt of alginic acid, polyvinylidene fluoride (PVDF), poly(vinylidene fluoride)-hexafluoropropene (PVDF-HFP), LA132, LA133, and combinations thereof. In certain embodiments, the salt of alginic acid comprises a cation selected from the group consisting of Na, Li, K, Ca, $NH_4$, Mg, Al, or a combination thereof.

In some embodiments, the binder material is SBR, CMC, PAA, a salt of alginic acid, or a combination thereof. In certain embodiments, the binder material is acrylonitrile copolymer. In some embodiments, the binder material is polyacrylonitrile. In certain embodiments, the binder material is free of SBR, CMC, PVDF, acrylonitrile copolymer, PAA, polyacrylonitrile, PVDF-HFP, LA132, LA133, latex, or a salt of alginic acid.

In other embodiments, a second suspension can be prepared by mixing a second conductive agent and a carbon active material in the second solvent.

In some embodiments, the second conductive agent is selected from the group consisting of carbon, conductive graphite, vapor-grown carbon fiber, KS6, KS15, expanded graphite and combinations thereof.

In certain embodiments, the particle size of the second conductive agent is from about 1 μm to about 10 μm, from about 1 μm to about 8 μm, from about 1 μm to about 6 μm, from about 1 μm to about 4 μm, from about 3 μm to about 10 μm, from about 3 μm to about 8 μm, from about 3 μm to about 6 μm, from about 5 μm to about 10 μm, or from about 5 μm to about 8 μm. In some embodiments, the particle size of the second conductive agent is less than 10 μm, less than 8 μm, less than 6 μm, less than 4 μm, or less than 2 μm. In certain embodiments, the particle size of the second conductive agent is more than 1 μm, more than 3 μm, more than 5 μm, more than 7 μm, or more than 9 μm.

In some embodiments, the second suspension has a solid content from about 0.5% to about 10%, from about 1% to about 10%, from about 1% to about 8%, from about 1% to about 6%, from about 1% to about 4%, from about 1% to about 2%, from about 2% to about 8%, from about 2% to about 6%, from about 2% to about 4%, or from about 5% to about 10% by weight, based on the total weight of the second suspension.

In some embodiments, a second suspension is prepared by mixing a second conductive agent and a carbon active material in the second solvent. The solid content of the second suspension is from about 15% to about 35%, from about 20% to about 35%, from about 20% to about 30%, from about 25% to about 35%, or from about 30% to about 35% by weight, based on the total weight of the second suspension.

In certain embodiments, the time period for dispersing the second conductive agent in the binder solution is from about 0.5 hour to about 3 hours, from about 0.5 hour to about 2 hours, from about 0.5 hour to about 1 hour, from about 1 hour to about 3 hours, or from about 1 hour to about 2 hours.

After forming the second suspension, the homogenized first suspension is mixed with the second suspension to form a third suspension. In certain embodiments, the time period for mixing the homogenized first suspension with the second suspension is from about 0.5 hour to about 3 hours, from about 0.5 hour to about 2 hours, from about 0.5 hour to about 1 hour, from about 1 hour to about 3 hours, or from about 1 hour to about 2 hours. In some embodiments, the time period for mixing the homogenized first suspension with the second suspension is more than 0.5 hour, 0.75 hour, or more than 1 hour.

In some embodiments, the first suspension and the second suspension are stirred or agitated to prevent settling of the particles before the two suspensions are mixed. Therefore, the particles in suspension can be kept for extended periods of time.

In certain embodiments, the third suspension has a solid content from about 3% to about 35%, from about 3% to about 30%, from about 3% to about 10%, from about 10% to about 35%, from about 15% to about 35%, from about 20% to about 35%, or from about 20% to about 25% by weight, based on the total weight of the third suspension.

In some embodiments, an anode slurry can be prepared by mixing the carbon active material with the third suspension. Mixing the homogeneous third suspension with carbon active material can prevent particle aggregation. In certain embodiments, the carbon active material is selected from the group consisting of hard carbon, soft carbon, graphite, mesocarbon microbeads, and combinations thereof. In other embodiments, the carbon active material is not hard carbon, soft carbon, graphite, or mesocarbon microbeads. In other embodiments, an anode slurry can be prepared by mixing a binder material with the third suspension.

In certain embodiments, the particle size of the carbon active material is from about 1 μm to about 30 μm, from about 1 μm to about 20 μm, from about 1 μm to about 10 μm, from about 10 μm to about 30 μm, from about 10 μm to about 20 μm, from about 15 μm to about 30 μm, from about 15 μm to about 25 μm, or from about 15 μm to about 20 μm. In some embodiments, the particle size of the carbon active material is larger than each of the particle size of the silicon-based material, first conductive agent and second conductive agent.

In some embodiments, the time period for mixing the carbon active material or binder material with the third suspension is from about 0.5 hour to about 6 hours, from about 1 hour to about 6 hours, from about 1 hour to about 5 hours, from about 1 hour to about 3 hours, from about 2 hours to about 6 hours, or from about 2 hours to about 4 hours.

When the amount of dispersant in the anode slurry is too large, the electrochemical performance of the anode prepared will be lowered. In certain embodiments, the amount of the dispersant in the anode slurry is from about 0.1% to about 5%, from about 0.1% to about 2%, from about 0.5% to about 5%, from about 0.5% to about 3%, from about 0.5% to about 2%, from about 1% to about 5%, from about 1% to about 4%, or from about 1% to about 3% by weight, based on the total weight of the solid content in the anode slurry. In some embodiments, the amount of the dispersant in the anode slurry is less than 10%, less than 5%, less than 4%, less than 3%, less than 2%, or less than 1% by weight, based on the total weight of solids in the anode slurry. In certain embodiments, the amount of the dispersant in the anode slurry is greater than 0.1%, greater than 0.5%, greater than 1%, greater than 2%, greater than 3%, or greater than 4% by weight, based on the total weight of the solid content in the anode slurry.

If the amount of the silicon-based material in the anode electrode layer is too high, the anode electrode layer will have a high cycle expansion. Thus, the silicon-based material of the present invention has a content from about 1% to about 20% by weight, based on the total weight of the solid content in the anode slurry. In other embodiments, the amount of the silicon-based material in the anode slurry is from about 1% to about 10%, from about 1% to about 8%, from about 1% to about 6%, from about 1% to about 4%, from about 3% to about 10%, from about 3% to about 8%, from about 5% to about 10%, from about 10% to about 20%, or from about 10% to about 15% by weight, based on the total weight of the solid content in the anode slurry.

In certain embodiments, the amount of the silicon-based material in the anode slurry is less than 20%, less than 15%, less than 10%, less than 5%, less than 4%, less than 3%, less than 2%, or less than 1% by weight, based on the total weight of the solid content in the anode slurry. In some embodiments, the content of the silicon-based material in the anode slurry is at most 1%, at most 2%, at most 3%, at most 4%, at most 5%, at most 10%, at most 15%, or at most 20% by weight, based on the total weight of the solid content in the anode slurry.

The first conductive agent having small particle size can be used to fill the void between larger electrode material particles to increase the packing density and electrical conductivity of an anode. In certain embodiments, the ratio of the particle size of the second conductive agent to the particle size of the first conductive agent is from about 20:1 to about 250:1, from about 20:1 to about 200:1, from about 20:1 to about 150:1, from about 20:1 to about 100:1, from about 20:1 to about 50:1, from about 50:1 to about 250:1, from about 50:1 to about 150:1, from about 50:1 to about 200:1, or from about 100:1 to about 250:1. In some embodiments, the ratio of the particle size of the second conductive agent to the particle size of the first conductive agent is less than 300:1, less than 250:1, less than 200:1, less than 150:1, less than 100:1, or less than 50:1. In certain embodiments, the ratio of the particle size of the second conductive agent to the particle size of the first conductive agent is greater than 10:1, greater than 20:1, greater than 50:1, greater than 100:1, or greater than 150:1.

In some embodiments, the amount of each of the first and second conductive agents in the anode slurry is independently at least 0.1%, at least 0.5%, at least 1%, at least 1.5%, at least 2%, at least 2.5%, at least 3%, at least 3.5%, at least 4%, at least 4.5%, at least 5%, at least 6%, or at least 7% by weight, based on the total weight of the solid content in the anode slurry. In certain embodiments, the amount of each of the first and second conductive agents in the anode slurry is independently at most 10%, at most 9%, at most 8%, at most 7%, at most 6%, at most 5%, at most 4.5%, at most 4%, or at most 3.5% by weight, based on the total weight of the solid content in the anode slurry.

In certain embodiments, the amount of each of the first and second conductive agents in the anode slurry is independently from about 0.5% to about 10%, from about 0.5% to about 5%, from about 1% to about 10%, from about 1% to about 8%, from about 1% to about 6%, from about 1% to about 5%, from about 1% to about 4%, from about 3% to about 7%, or from about 3% to about 5% by weight, based on the total weight of the solid content in the anode slurry.

In some embodiments, the total amount of the first conductive agent and second conductive agent in the anode slurry is from about 0.1% to about 10%, from about 0.5% to about 10%, from about 0.5% to about 8%, from about 0.5% to about 5%, from about 1% to about 7%, from about 1% to about 5%, from about 3% to about 8%, or from about 3% to about 5% by weight, based on the total weight of the solid content in the anode slurry. In certain embodiments, the total amount of the first conductive agent and second conductive agent in the anode slurry is at least 0.1%, at least 0.5%, at least 1%, at least 2%, at least 3%, at least 4%, or at least 5% by weight, based on the total weight of the solid content in the anode slurry.

In some embodiments, the weight ratio of the first conductive agent to the second conductive agent in the anode slurry is from about 1:1 to about 2:1, from about 1:1 to about 1.8:1, from about 1:1 to about 1.6:1, from about 1:1 to about 1.5:1, from about 1:1 to about 1.3:1, from about 1:1 to about 1.1:1, from about 1.2:1 to about 1.8:1, from about 1.3:1 to about 1.7:1, or from about 1.5:1 to about 2:1. In certain embodiments, the weight ratio of the first conductive agent to the second conductive agent in the anode slurry is less than 3:1, less than 2.5:1, less than 2:1, or less than 1.5:1. In some embodiments, the weight ratio of the first conductive agent to the second conductive agent in the anode slurry is greater than 0.5:1, greater than 1:1, or greater than 1.5:1.

In some embodiments, the weight ratio of the silicon-based material to the first conductive agent is from about 1.7:1 to about 5:1, from about 1.7:1 to about 4:1, from about 1.7:1 to about 3:1, from about 2:1 to about 5:1, from about 2:1 to about 4:1, from about 2:1 to about 3:1, or from about 3:1 to about 5:1. In certain embodiments, the weight ratio of the silicon-based material to the first conductive agent is less than 2.5:1, less than 3:1, less than 3.5:1, less than 4:1, or less than 4.5:1. In certain embodiments, the weight ratio of the silicon-based material to the first conductive agent is greater than 1.7:1, greater than 2:1, greater than 2.5:1, greater than 3:1, greater than 3.5:1, greater than 4:1, or greater than 4.5:1.

In some embodiments, the amount of the binder material in the anode slurry is at least 0.1%, at least 0.5%, at least 1%, at least 2%, at least 3%, at least 4%, at least 5%, or at least 10% by weight, based on the total weight of the solid content in the anode slurry. In some embodiments, the amount of the binder material in the anode slurry is at most 0.1%, at most 0.5%, at most 1%, at most 2%, at most 3%, at most 4%, at most 5%, or at most 10% by weight, based on the total weight of the solid content in the anode slurry.

In certain embodiments, the amount of the binder material in the anode slurry is from about 0.1% to about 5%, from about 0.1% to about 2%, from about 0.1% to about 1%, from about 1% to about 10%, from about 1% to about 5%, from about 3% to about 10%, or from about 5% to about 10% by weight, based on the total weight of the solid content in the anode slurry.

The resulting anode slurry may contain up to 50% or 60% dispersed solids by weight, based on total weight of the anode slurry. In some embodiments, the anode slurry has a solid content from about 25% to about 65%, from about 30% to about 65%, from about 30% to about 60%, from about 30% to about 55%, from about 30% to about 50%, from about 35% to about 60%, from about 35% to about 50%, or from about 40% to about 55% by weight, based on the total weight of the anode slurry.

In some embodiments, the mixing or dispersing of anode slurry can be carried out by a stirring mixer, a blender, a mill, a rotor-stator homogenizer, or a high pressure homogenizer. In further embodiments, the stirring mixer is a planetary stirrer. In certain embodiments, the rotational speed of planetary and high speed dispersion blades is the same. In other embodiments, the rotational speed of the planetary blade is from about 50 rpm to about 200 rpm and rotational speed of the dispersion blade is from about 1,000 rpm to about 3,500 rpm.

In certain embodiments, D10 of the particles in the anode slurry is from about 0.5 μm to about 10 μm, from about 1 μm to about 10 μm, from about 1 μm to about 8 μm, from about 1 μm to about 6 μm, from about 3 μm to about 10 μm, from about 3 μm to about 8 μm, from about 3 μm to about 6 μm, or from about 4 μm to about 6 μm.

In some embodiments, D50 of the particles in the anode slurry is from about 1 μm to about 25 μm, from about 5 μm to about 25 μm, from about 5 μm to about 20 μm, from about 10 μm to about 25 μm, from about 10 μm to about 20 μm, from about 10 μm to about 18 μm, from about 12 μm to about 18 μm, or from about 14 μm to about 16 μm.

In certain embodiments, D90 of the particles in the anode slurry is from about 5 μm to about 40 μm, from about 10 μm to about 40 μm, from about 10 μm to about 30 μm, from about 20 μm to about 40 μm, from about 20 μm to about 35 μm, from about 20 μm to about 30 μm, from about 20 μm to about 28 µm, from about 20 µm to about 26 µm, or from about 25 µm to about 30 µm.

Viscosity control is essential to a coating process. In some embodiments, the viscosity of the anode slurry is from about 1,000 cps to about 10,000 cps, from about 1,000 cps to about 8,000 cps, from about 1,000 cps to about 6,000 cps, from about 1,000 cps to about 3,000 cps, from about 2,000 cps to about 8,000 cps, from about 2,000 cps to about 6,000 cps, from about 3,000 cps to about 8,000 cps, from about 3,000 cps to about 6,000 cps, from about 3,000 cps to about 5,000 cps, or from about 4,000 cps to about 6,000 cps.

The viscosity of the anode slurry disclosed herein is stabilized. Constant viscosities in different parts of the anode slurry and a uniform dispersion state in the anode slurry can be retained for a long time. Uniform distributions of the active material and the conductive agents over the whole surfaces of the electrode can be obtained by coating the anode slurry on the anode current collector.

EXAMPLES

Example 1

A) Preparation of a First Suspension

A dispersant solution was prepared by dissolving 0.1 kg of polyvinyl alcohol (PVA; obtained from Aladdin Industries Corporation, China) in 2 L deionized water. The dispersant solution had a viscosity of 20 cP. A first suspension was then prepared by dispersing 0.5 kg of silicon having a particle size of 50 nm (obtained from CWNANO Co. Ltd., China) and 0.2 kg of acetylene black (obtained from Timcal Ltd., Bodio, Switzerland) having a particle size of 50 nm in the dispersant solution. The first suspension had a solid content of 28.6 wt. %. The first suspension was ultrasonicated by a 30 L ultrasonicator (G-100ST; obtained from Shenzhen Geneng Cleaning Equipment Co. Ltd., China) at a power density of 20 W/L and stirred by a 5 L planetary mixer (CMOS, obtained from ChienMei Co. Ltd., China) simultaneously at 25° C. for about 2 hours to obtain a homogenized first suspension. The stirring speed of the planetary blade was 40 rpm and the stirring speed of the dispersion blade was 2,500 rpm.

B) Preparation of a Second Suspension

A binder solution was prepared by mixing 0.2 kg of polyacrylic acid (PAA, #181285, obtained from Sigma-Aldrich, US) with 20 L deionized water. A second suspension was prepared by dispersing 0.1 kg of KS15 (obtained from Timcal Ltd., Bodio, Switzerland) having a particle size of 5 µm in the binder solution with a 30 L planetary mixer (CM30; obtained from ChienMei Co. Ltd., China) for 1 hour to obtain a second suspension having a solid content of 1.5 wt. %. The stirring speed of the planetary blade was 40 rpm and the stirring speed of the dispersion blade was 2,500 rpm.

C) Preparation of a Third Suspension

A third suspension was prepared by mixing the homogenized first suspension with the second suspension with a 30 L planetary mixer for 1 hour. The suspension had a solid content of 4.8 wt. %. The stirring speed of the planetary blade was 40 rpm and the stirring speed of the dispersion blade was 2,500 rpm.

D) Preparation of an Anode Slurry

An anode slurry was prepared by mixing 8.9 kg of graphite (#282863, obtained from Sigma-Aldrich, US) having a particle size of 15 µm with the third suspension with a 30 L planetary mixer for 1 hour. The anode slurry had a solid content of 31.3 wt. %. The stirring speed of the planetary blade was 40 rpm and the stirring speed of the dispersion blade was 2,500 rpm.

E) Measurements of Particle Size Distributions of First Suspension and Anode Slurry Particle size distributions of the first suspension and the anode slurry were measured by a laser diffraction particle size distribution analyzer (Mastersizer 3000, Malvern Instruments Ltd., UK). Samples were delivered to the measurement area of the optical bench in a stable state of dispersion. The measurement of particle sizes was carried out while the particles were sufficiently dispersed.

F) Assembling of Coin Cells

A negative electrode was prepared by coating the anode slurry onto one side of a copper foil having a thickness of 9 µm using a doctor blade coater (obtained from Shenzhen KejingStar Technology Ltd., China; model no. MSK-AFA-III) with an area density of about 8 mg/cm$^2$. The coated film on the copper foil was dried by an electrically heated conveyor oven set at 90° C. for 2 hours.

The coated anode sheet was cut into disc-form negative electrodes for coin cell assembly. A lithium metal foil having a thickness of 500 µm was used as a counter electrode. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. Three CR2032 coin cells were assembled in an argon-filled glove box.

G) Assembling of Pouch Cell

I) Preparation of Anode

The anode slurry prepared above was coated onto both sides of a copper foil having a thickness of 9 µm using a transfer coater with an area density of about 15 mg/cm$^2$. The coated films on the copper foil were dried at about 50° C. for 2.4 minutes by a 24-meter-long conveyor hot air dryer operated at a conveyor speed of about 10 meters/minute to obtain an anode.

II) Preparation of Cathode Slurry

A cathode slurry was prepared by mixing 92 wt. % $LiMn_2O_4$ cathode active material (obtained from HuaGuan HengYuan LiTech Co. Ltd., Qingdao, China), 4 wt. % carbon black (SuperP; obtained from Timcal Ltd, Bodio, Switzerland) as a conductive agent, and 4 wt. % polyvinylidene fluoride (PVDF; Solef® 5130, obtained from Solvay S.A., Belgium) as a binder, which were dispersed in a mixed solvent containing 50 wt. % N-methyl-2-pyrrolidone (NMP; purity of ≥99%, Sigma-Aldrich, USA) and 50 wt. % acetone (purity of ≥99%, Sigma-Aldrich, USA) to form a slurry with a solid content of 50 wt. %. The slurry was homogenized by a planetary stirring mixer.

III) Preparation of Cathode

The homogenized slurry was coated onto both sides of an aluminum foil having a thickness of 20 µm as a current collector using a doctor blade coater with a gap width of 100 µm. The coated film on the aluminum foil was dried by an electrically heated conveyor oven at 85° C. at a conveyor speed of about 8 meters/minute to obtain a cathode.

IV) Assembling of Pouch Cell

After drying, the resulting cathode film and anode film were used to prepare the cathode and anode respectively by cutting them into individual electrode plates. A pouch cell was assembled by stacking the cathode and anode electrode plates alternatively and then packaged in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content less than 1 ppm.

The electrolyte was a solution of LiPF$_6$ (1 M) in a mixture of ethylene carbonate (EC), ethyl methyl carbonate (EMC) and dimethyl carbonate (DMC) in a volume ratio of 1:1:1. After electrolyte filling, the pouch cell was vacuum sealed and then mechanically pressed using a punch tooling with standard square shape.

H) Electrochemical Measurement

I) Discharging Rate Performance of Coin Cells

The discharging rate performance of the coin cells prepared above was evaluated. The coin cells were analyzed in a constant current mode using a multi-channel battery tester (BTS-4008-5V10 mA, obtained from Neware Electronics Co. Ltd., China). After an initial activation process at C/10 for 1 cycle, the cells were fully charged at a rate of C/10 and then discharged at a rate of C/10. This procedure was repeated by discharging the fully charged battery module at various C-rates (1 C, 3 C and 5 C) to evaluate the discharging rate performance. The voltage range was between 0.005 V and 1.5 V.

II) Cyclability Performance of Pouch Cell

The cyclability performance of the pouch cell was tested by charging and discharging at a constant current rate of 1 C between 3.0 V and 4.2 V.

Example 2

A) Preparation of a First Suspension

A dispersant solution was prepared by dissolving 0.1 kg of polyvinyl alcohol (PVA; obtained from Aladdin Industries Corporation, China) in 2 L N-methyl-2-pyrrolidone (NMP; purity of ≥99%, Sigma-Aldrich, USA). The dispersant solution had a viscosity of 20 cP. A first suspension was then prepared by dispersing 0.5 kg of silicon carbon composite having a particle size of 50 nm (Si/C; obtained from CWNANO Co. Ltd., China) and 0.2 kg of acetylene black (obtained from Timcal Ltd., Bodio, Switzerland) having a particle size of 50 nm in the dispersant solution. The first suspension had a solid content of 28.6 wt. %. The first suspension was ultrasonicated by a 30 L ultrasonicator at a power density of 20 W/L and stirred by a 5 L planetary mixer simultaneously at 25° C. for about 2 hours to obtain a homogenized first suspension. The stirring speed of the planetary blade was 40 rpm and the stirring speed of the dispersion blade was 2,500 rpm.

B) Preparation of a Second Suspension

A binder solution was prepared by mixing 0.2 kg of polyvinylidene fluoride (PVDF; #181285, obtained from Sigma-Aldrich, US) with 20 L N-methyl-2-pyrrolidone (NMP; purity of ≥99%, Sigma-Aldrich, US). A second suspension was prepared by dispersing 0.1 kg of KS15 (obtained from Timcal Ltd., Bodio, Switzerland) having a particle size of 5 μm (obtained from Timcal Ltd., Bodio, Switzerland) in the binder solution with a 30 L planetary mixer for 1 hour to obtain a second suspension having a solid content of 1.5 wt. %. The stirring speed of the planetary blade was 40 rpm and the stirring speed of the dispersion blade was 2,500 rpm.

C) Preparation of a Third Suspension

A third suspension was prepared by mixing the homogenized first suspension with the second suspension with a 30 L planetary mixer for 1 hour. The suspension had a solid content of 4.8 wt. %. The stirring speed of the planetary blade was 40 rpm and the stirring speed of the dispersion blade was 2,500 rpm.

D) Preparation of an Anode Slurry

An anode slurry was prepared by mixing 8.9 kg of graphite (#282863, obtained from Sigma-Aldrich, US) having a particle size of 15 μm with the third suspension with a 30 L planetary mixer for 1 hour. The anode slurry had a solid content of 31.3 wt. %. The stirring speed of the planetary blade was 40 rpm and the stirring speed of the dispersion blade was 2,500 rpm.

Example 3

A) Preparation of a First Suspension

A dispersant solution was prepared by dissolving 0.1 kg of polyethylene oxide (PEO; #181986, obtained from Sigma-Aldrich, US) in 2 L deionized water. The dispersant solution had a viscosity of 20 cP. A first suspension was then prepared by dispersing 0.5 kg of silicon carbon composite having a particle size of 50 nm (Si/C; obtained from CWNANO Co. Ltd., China) and 0.2 kg of Super P (super P; obtained from Timcal Ltd., Bodio, Switzerland) having a particle size of 50 nm in the dispersant solution. The first suspension had a solid content of 28.6 wt. %. The first suspension was ultrasonicated by a 30 L ultrasonicator at a power density of 20 W/L and stirred by a 5 L planetary mixer simultaneously at 25° C. for about 2 hours to obtain a homogenized first suspension. The stirring speed of the planetary blade was 40 rpm and the stirring speed of the dispersion blade was 2,500 rpm.

B) Preparation of a Second Suspension

A binder solution was prepared by mixing 0.2 kg of polyacrylic acid (PAA, #181285, obtained from Sigma-Aldrich, US) with 20 L deionized water. A second suspension was prepared by dispersing 0.1 kg of KS6 (obtained from Timcal Ltd., Bodio, Switzerland) having a particle size of 5 μm in the binder solution with a 30 L planetary mixer for 1 hour to obtain a second suspension having a solid content of 1.5 wt. %. The stirring speed of the planetary blade was 40 rpm and the stirring speed of the dispersion blade was 2,500 rpm.

C) Preparation of a Third Suspension

A third suspension was prepared by mixing the homogenized first suspension with the second suspension with a 30 L planetary mixer for 1 hour. The suspension had a solid content of 4.8 wt. %. The stirring speed of the planetary blade was 40 rpm and the stirring speed of the dispersion blade was 2,500 rpm.

D) Preparation of an Anode Slurry

An anode slurry was prepared by mixing 8.9 kg of graphite (#282863, obtained from Sigma-Aldrich, US) having a particle size of 15 μm with the third suspension with a 30 L planetary mixer for 1 hour. The anode slurry had a solid content of 31.3 wt. %. The stirring speed of the planetary blade was 40 rpm and the stirring speed of the dispersion blade was 2,500 rpm.

Example 4

A) Preparation of a First Suspension

A dispersant solution was prepared by dissolving 0.1 kg of carboxymethyl cellulose (CMC; BSH-12; DKS Co. Ltd., Japan) in 2 L deionized water. The dispersant solution had a viscosity of 20 cP. A first suspension was then prepared by dispersing 0.5 kg of silicon carbon composite having a particle size of 50 nm (Si/C; obtained from CWNANO Co. Ltd., China) and 0.2 kg of Super P (obtained from Timcal Ltd., Bodio, Switzerland) having a particle size of 50 nm in the dispersant solution. The first suspension had a solid content of 28.6 wt. %. The first suspension was ultrasonicated by a 30 L ultrasonicator at a power density of 20 W/L and stirred by a 5 L planetary mixer simultaneously at 25°

C. for about 2 hours to obtain a homogenized first suspension. The stirring speed of the planetary blade was 40 rpm and the stirring speed of the dispersion blade was 2,500 rpm.

B) Preparation of a Second Suspension

A second suspension was prepared by mixing 0.1 kg of KS6 (obtained from Timcal Ltd., Bodio, Switzerland) having a particle size of 5 μm with 8.9 kg of graphite (#282863, obtained from Sigma-Aldrich, US) having a particle size of 15 μm with a 30 L planetary mixer for 1 hour in 20 L deionized water. The second suspension had a solid content of 30.8 wt. %. The stirring speed of the planetary blade was 40 rpm and the stirring speed of the dispersion blade was 2,500 rpm.

C) Preparation of a Third Suspension

A third suspension was prepared by mixing the homogenized first suspension with the second suspension with a 30 L planetary mixer for 1 hour. The suspension had a solid content of 30.8 wt. %. The stirring speed of the planetary blade was 40 rpm and the stirring speed of the dispersion blade was 2,500 rpm.

D) Preparation of an Anode Slurry

An anode slurry was prepared by mixing 0.2 kg of styrene-butadiene rubber (SBR; AL-2001; NIPPON A&L INC., Japan) with the third suspension with a 30 L planetary mixer for 1 hour. The anode slurry had a solid content of 31.3 wt. %. The stirring speed of the planetary blade was 40 rpm and the stirring speed of the dispersion blade was 2,500 rpm.

Example 5

An anode slurry was prepared by the method described in Example 1 except that the first conductive agent having a particle size of 20 nm instead of 50 nm was used.

Example 6

An anode slurry was prepared by the method described in Example 1 except that the first conductive agent having a particle size of 100 nm instead of 50 nm was used.

Example 7

An anode slurry was prepared by the method described in Example 1 except that the second conductive agent having a particle size of 1 μm instead of 5 μm was used.

Example 8

An anode slurry was prepared by the method described in Example 1 except that the second conductive agent having a particle size of 10 μm instead of 5 μm was used.

Example 9

An anode slurry was prepared by the method described in Example 1 except that the silicon-based material having a particle size of 10 nm instead of 50 nm was used.

Example 10

An anode slurry was prepared by the method described in Example 1 except that the silicon-based material having a particle size of 800 nm instead of 50 nm was used.

Example 11

An anode slurry was prepared by the method described in Example 1 except that 0.1 kg of first conductive agent instead of 0.2 kg was used.

Example 12

An anode slurry was prepared by the method described in Example 1 except that 6 L of deionized water was used to prepare a dispersant solution instead of 2 L, 16 L of deionized water was used to prepare a binder solution instead of 20 L, and different weight ratio of electrode materials were used.

Comparative Example 1

An anode slurry was prepared by the method described in Example 1 except that a dispersant solution was not prepared, and the silicon-based material and first conductive agent were dispersed in deionized water to form a first suspension.

Comparative Example 2

An anode slurry was prepared by the method described in Example 3 except that the second conductive agent was added in the first solvent instead of the second solvent. A first suspension was prepared by dispersing the silicon-based material, the first and second conductive agents in the dispersant solution.

Comparative Example 3

An anode slurry was prepared by the method described in Example 3 except that the first conductive agent was added in the second solvent instead of the first solvent. A second suspension was prepared by dispersing the first and second conductive agents in the binder solution.

Comparative Example 4

An anode slurry was prepared by the method described in Example 3 except that a second conductive agent was not added when preparing the second suspension and 0.3 kg of first conductive agent was used instead of 0.2 kg.

Comparative Example 5

An anode slurry was prepared by the method described in Example 1 except that a first conductive agent was not added when preparing the first suspension and 0.3 kg of second conductive agent was used instead of 0.1 kg.

Comparative Example 6

An anode slurry was prepared by the method described in Example 1 except that the first conductive agent having a particle size of 5 nm instead of 50 nm was used.

Comparative Example 7

An anode slurry was prepared by the method described in Example 1 except that the first conductive agent having a particle size of 300 nm instead of 50 nm was used.

Comparative Example 8

An anode slurry was prepared by the method described in Example 1 except that the second conductive agent having a particle size of 0.7 μm instead of 5 μm was used.

Comparative Example 9

An anode slurry was prepared by the method described in Example 1 except that the second conductive agent having a particle size of 15 μm instead of 5 μm was used.

Comparative Example 10

An anode slurry was prepared by the method described in Example 1 except that the silicon-based material having a particle size of 1 nm instead of 50 nm was used.

Comparative Example 11

An anode slurry was prepared by the method described in Example 1 except that the silicon-based material having a particle size of 1 μm instead of 50 nm was used.

Comparative Example 12

An anode slurry was prepared by the method described in Example 1 except that 1 kg of first conductive agent was used instead of 0.2 kg.

Comparative Example 13

An anode slurry was prepared by the method described in Example 1 except that 0.4 kg of second conductive agent was used instead of 0.1 kg.

Preparation of Coin Cells of Examples 2-12 and Comparative Examples 1-13

Coin cells were prepared by the method described in Example 1.

Preparation of Pouch Cells of Examples 2-12 and Comparative Examples 1-13

Pouch cells were prepared by the method described in Example 1.

Measurements of Particle Size Distributions of First Suspension and Anode Slurries of Examples 2-12 and Comparative Examples 1-13

Particle size distributions of first suspension and anode slurries were measured by the method described in Example 1.

Electrochemical Measurements of Coin Cells and Pouch Cells of Examples 2-12 and Comparative Examples 1-13

Electrochemical performance of coin cells and pouch cells were measured by the method described in Example 1.

The formulations of the dispersant solutions and first suspensions of Examples 1-3, 5-12 and Comparative Examples 1, 4-13 are shown in Table 1 below. The formulations of the second suspensions and anode slurries of Examples 1-3, 5-12 and Comparative Examples 1, 4-13 are shown in Table 2 below. The particle size distributions of the first suspensions and the anode slurries of Examples 1-12 and Comparative Examples 1-13 are shown in Table 3 below. The discharging rate performance of coin cells and cyclability performance of pouch cells of Examples 1-12 and Comparative Examples 1-13 are shown in Table 4 and 5 below respectively.

The anode slurries prepared by methods described in Examples 1-12 yielded a more controlled particle size distributions. The coin cells of Examples 1-12 showed excellent rate performance at low and high discharge rates. Also, the pouch cells of Examples 1-12 showed excellent cyclability.

TABLE 1

| | Amount of materials used (kg) | | | Dispersant solution | | First suspension | | | | | | Solvent used in dispersant solution and first suspension |
|---|---|---|---|---|---|---|---|---|---|---|---|---|
| | | | | | | Particle size (nm) | | | Wt. % of components | | | |
| | Dispersant | Si-based material | 1st conductive agent | Dispersant | Wt. % of dispersant | Si-based material | 1st conductive agent | Dispersant | Si-based material | 1st conductive agent | | |
| Example 1 | 0.1 | 0.5 | 0.2 | PVA | 4.8 | 50 | 50 | 3.6 | 17.9 | 7.1 | Water |
| Example 2 | 0.1 | 0.5 | 0.2 | PVA | 4.8 | 50 | 50 | 3.6 | 17.9 | 7.1 | NMP |
| Example 3 | 0.1 | 0.5 | 0.2 | PEO | 4.8 | 50 | 50 | 3.6 | 17.9 | 7.1 | Water |
| Example 5 | 0.1 | 0.5 | 0.2 | PVA | 4.8 | 50 | 20 | 3.6 | 17.9 | 7.1 | Water |
| Example 6 | 0.1 | 0.5 | 0.2 | PVA | 4.8 | 50 | 100 | 3.6 | 17.9 | 7.1 | Water |
| Example 7 | 0.1 | 0.5 | 0.2 | PVA | 4.8 | 50 | 50 | 3.6 | 17.9 | 7.1 | Water |
| Example 8 | 0.1 | 0.5 | 0.2 | PVA | 4.8 | 50 | 50 | 3.6 | 17.9 | 7.1 | Water |
| Example 9 | 0.1 | 0.5 | 0.2 | PVA | 4.8 | 10 | 50 | 3.6 | 17.9 | 7.1 | Water |
| Example 10 | 0.1 | 0.5 | 0.2 | PVA | 4.8 | 800 | 50 | 3.6 | 17.9 | 7.1 | Water |
| Example 11 | 0.1 | 0.5 | 0.1 | PVA | 4.8 | 50 | 50 | 3.7 | 18.5 | 3.7 | Water |
| Example 12 | 0.3 | 1.5 | 0.6 | PVA | 4.8 | 50 | 50 | 3.6 | 17.9 | 7.1 | Water |
| Comparative Example 1 | / | 0.5 | 0.2 | / | / | 50 | 50 | / | 18.5 | 7.4 | Water |
| Comparative Example 4 | 0.1 | 0.5 | 0.3 | PEO | 4.8 | 50 | 50 | 3.4 | 17.2 | 10.3 | Water |
| Comparative Example 5 | 0.1 | 0.5 | / | PVA | 4.8 | 50 | / | 3.8 | 19.2 | / | Water |
| Comparative Example 6 | 0.1 | 0.5 | 0.2 | PVA | 4.8 | 50 | 5 | 3.6 | 17.9 | 7.1 | Water |
| Comparative Example 7 | 0.1 | 0.5 | 0.2 | PVA | 4.8 | 50 | 300 | 3.6 | 17.9 | 7.1 | Water |
| Comparative Example 8 | 0.1 | 0.5 | 0.2 | PVA | 4.8 | 50 | 50 | 3.6 | 17.9 | 7.1 | Water |
| Comparative Example 9 | 0.1 | 0.5 | 0.2 | PVA | 4.8 | 50 | 50 | 3.6 | 17.9 | 7.1 | Water |
| Comparative Example 10 | 0.1 | 0.5 | 0.2 | PVA | 4.8 | 1 | 50 | 3.6 | 17.9 | 7.1 | Water |
| Comparative Example 11 | 0.1 | 0.5 | 0.2 | PVA | 4.8 | 1,000 | 50 | 3.6 | 17.9 | 7.1 | Water |
| Comparative Example 12 | 0.1 | 0.5 | 1 | PVA | 4.8 | 50 | 50 | 2.8 | 13.9 | 27.8 | Water |
| Comparative Example 13 | 0.1 | 0.5 | 0.2 | PVA | 4.8 | 50 | 50 | 3.6 | 17.9 | 7.1 | Water |

TABLE 2

| | Amount of materials used (kg) | | | Second suspension | | | Anode slurry | | Ratio of particle size of 2nd conductive agent to 1st conductive agent | Wt. ratio of 1st conductive agent to 2nd conductive agent |
|---|---|---|---|---|---|---|---|---|---|---|
| | | | | Particle size (μm) of 2nd conductive agent | Wt. % of components | | Carbon active material | | | |
| | 2nd conductive agent | Binder material | Carbon active material | | 2nd conductive agent | Binder material | Particle size (μm) | Wt. % | | |
| Example 1 | 0.1 | 0.2 | 8.9 | 5 | 0.49 | 0.99 | 15 | 27.8 | 100 | 2 |
| Example 2 | 0.1 | 0.2 | 8.9 | 5 | 0.49 | 0.99 | 15 | 27.8 | 100 | 2 |
| Example 3 | 0.1 | 0.2 | 8.9 | 5 | 0.49 | 0.99 | 15 | 27.8 | 100 | 2 |
| Example 5 | 0.1 | 0.2 | 8.9 | 5 | 0.49 | 0.99 | 15 | 27.8 | 250 | 2 |
| Example 6 | 0.1 | 0.2 | 8.9 | 5 | 0.49 | 0.99 | 15 | 27.8 | 50 | 2 |
| Example 7 | 0.1 | 0.2 | 8.9 | 1 | 0.49 | 0.99 | 15 | 27.8 | 20 | 2 |
| Example 8 | 0.1 | 0.2 | 8.9 | 10 | 0.49 | 0.99 | 15 | 27.8 | 200 | 2 |
| Example 9 | 0.1 | 0.2 | 8.9 | 5 | 0.49 | 0.99 | 15 | 27.8 | 100 | 2 |
| Example 10 | 0.1 | 0.2 | 8.9 | 5 | 0.49 | 0.99 | 15 | 27.8 | 100 | 2 |
| Example 11 | 0.1 | 0.2 | 8.9 | 5 | 0.49 | 0.99 | 15 | 27.9 | 100 | 1 |
| Example 12 | 0.3 | 0.4 | 6.9 | 5 | 1.80 | 2.40 | 15 | 21.6 | 100 | 2 |
| Comparative Example 1 | 0.1 | 0.2 | 8.9 | 5 | 0.49 | 0.99 | 15 | 27.8 | 100 | 2 |
| Comparative Example 4 | / | 0.2 | 8.9 | / | / | 0.99 | 15 | 27.8 | / | / |
| Comparative Example 5 | 0.3 | 0.2 | 8.9 | 5 | 1.46 | 0.98 | 15 | 27.8 | / | / |
| Comparative Example 6 | 0.1 | 0.2 | 8.9 | 5 | 0.49 | 0.99 | 15 | 27.8 | 1,000 | 2 |
| Comparative Example 7 | 0.1 | 0.2 | 8.9 | 5 | 0.49 | 0.99 | 15 | 27.8 | 16.7 | 2 |
| Comparative Example 8 | 0.1 | 0.2 | 8.9 | 0.7 | 0.49 | 0.99 | 15 | 27.8 | 14 | 2 |
| Comparative Example 9 | 0.1 | 0.2 | 8.9 | 15 | 0.49 | 0.99 | 15 | 27.8 | 300 | 2 |
| Comparative Example 10 | 0.1 | 0.2 | 8.9 | 5 | 0.49 | 0.99 | 15 | 27.8 | 100 | 2 |
| Comparative Example 11 | 0.1 | 0.2 | 8.9 | 5 | 0.49 | 0.99 | 15 | 27.8 | 100 | 2 |
| Comparative Example 12 | 0.1 | 0.2 | 8.9 | 5 | 0.49 | 0.99 | 15 | 27.1 | 100 | 10 |
| Comparative Example 13 | 0.4 | 0.2 | 8.9 | 5 | 1.94 | 0.97 | 15 | 27.6 | 100 | 0.5 |

TABLE 3

| | PSD of first suspension (nm) | | | PSD of anode slurry (μm) | | |
|---|---|---|---|---|---|---|
| | D10 | D50 | D90 | D10 | D50 | D90 |
| Example 1 | 15 | 45 | 80 | 4.5 | 14.7 | 25.3 |
| Example 2 | 17 | 46 | 78 | 5.1 | 15.8 | 27.3 |
| Example 3 | 13 | 50 | 86 | 5.6 | 15.3 | 26.7 |
| Example 4 | 15 | 48 | 83 | 4.9 | 15.7 | 24.8 |
| Example 5 | 11 | 40 | 70 | 4.9 | 15.1 | 24.1 |
| Example 6 | 31 | 89 | 112 | 5.4 | 15.9 | 24.7 |
| Example 7 | 16 | 50 | 80 | 6.3 | 16.2 | 25.1 |
| Example 8 | 15 | 45 | 84 | 5.8 | 16.4 | 27.5 |
| Example 9 | 10 | 37 | 66 | 5.7 | 15.4 | 26.3 |
| Example 10 | 270 | 782 | 1,053 | 5.3 | 16.1 | 26.8 |
| Example 11 | 15 | 46 | 87 | 5.8 | 15.7 | 27.2 |
| Example 12 | 16 | 45 | 83 | 5.1 | 15.1 | 27.9 |
| Comparative Example 1 | 35 | 220 | 468 | 7.9 | 18.6 | 32.5 |
| Comparative Example 2 | 1,650 | 5,120 | 7,130 | 8.2 | 19.3 | 41.2 |
| Comparative Example 3 | 16 | 55 | 81 | 7.6 | 17.3 | 32.4 |
| Comparative Example 4 | 19 | 49 | 79 | 6.8 | 16.2 | 31.3 |
| Comparative Example 5 | 21 | 54 | 84 | 7.1 | 17.5 | 32.5 |
| Comparative Example 6 | 6 | 31 | 63 | 7.2 | 17.8 | 33.6 |
| Comparative Example 7 | 124 | 295 | 530 | 6.8 | 17.1 | 34.8 |
| Comparative Example 8 | 17 | 49 | 84 | 6.7 | 18.1 | 31.8 |
| Comparative Example 9 | 18 | 50 | 90 | 7.9 | 19.8 | 41.5 |
| Comparative Example 10 | 4 | 20 | 49 | 6.8 | 17.4 | 34.5 |
| Comparative Example 11 | 358 | 983 | 2,113 | 7.1 | 17.5 | 32.8 |
| Comparative Example 12 | 25 | 57 | 128 | 6.7 | 17.2 | 33.1 |
| Comparative Example 13 | 18 | 47 | 79 | 7.1 | 18.0 | 35.1 |

TABLE 4

| | Discharging rate performance (%) | | |
|---|---|---|---|
| | 1 C | 3 C | 5 C |
| Example 1 | 90.1 | 74.8 | 61.5 |
| Example 2 | 90.3 | 75.1 | 62.1 |
| Example 3 | 89.7 | 73.5 | 60.3 |
| Example 4 | 89.1 | 74.1 | 60.1 |
| Example 5 | 88.7 | 73.5 | 60.2 |
| Example 6 | 88.9 | 73.9 | 61.3 |
| Example 7 | 89.2 | 75.2 | 62.1 |
| Example 8 | 89.1 | 76.1 | 61.9 |
| Example 9 | 89.3 | 74.5 | 61.3 |
| Example 10 | 88.5 | 74.1 | 63.2 |
| Example 11 | 89.9 | 74.9 | 61.4 |
| Example 12 | 88.9 | 73.5 | 60.5 |
| Comparative Example 1 | 84.2 | 62.3 | 43.2 |
| Comparative Example 2 | 86.8 | 68.2 | 50.1 |
| Comparative Example 3 | 85.1 | 63.3 | 46.1 |
| Comparative Example 4 | 86.0 | 64.5 | 47.2 |
| Comparative Example 5 | 85.2 | 61.8 | 46.8 |
| Comparative Example 6 | 86.3 | 62.1 | 46.9 |
| Comparative Example 7 | 85.7 | 63.4 | 47.1 |
| Comparative Example 8 | 84.9 | 64.7 | 44.1 |
| Comparative Example 9 | 81.7 | 60.2 | 42.1 |
| Comparative Example 10 | 86.2 | 63.3 | 43.7 |

TABLE 4-continued

|  | Discharging rate performance (%) | | |
| --- | --- | --- | --- |
|  | 1 C | 3 C | 5 C |
| Comparative Example 11 | 85.9 | 63.4 | 45.9 |
| Comparative Example 12 | 83.2 | 61.7 | 44.1 |
| Comparative Example 13 | 82.7 | 63.8 | 45.9 |

TABLE 5

|  | Cycle life (80% capacity retention) |
| --- | --- |
| Example 1 | 1,560 |
| Example 2 | 1,420 |
| Example 3 | 1,610 |
| Example 4 | 1,500 |
| Example 5 | 1,480 |
| Example 6 | 1,530 |
| Example 7 | 1,410 |
| Example 8 | 1,520 |
| Example 9 | 1,480 |
| Example 10 | 1,470 |
| Example 11 | 1,540 |
| Example 12 | 1,460 |
| Comparative Example 1 | 750 |
| Comparative Example 2 | 920 |
| Comparative Example 3 | 1,020 |
| Comparative Example 4 | 1,210 |
| Comparative Example 5 | 1,240 |
| Comparative Example 6 | 1,140 |
| Comparative Example 7 | 1,110 |
| Comparative Example 8 | 1,040 |
| Comparative Example 9 | 900 |
| Comparative Example 10 | 1,010 |
| Comparative Example 11 | 820 |
| Comparative Example 12 | 860 |
| Comparative Example 13 | 780 |

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A method for preparing an anode slurry, comprising the steps of:
   1) mixing a dispersant with a first solvent to form a dispersant solution;
   2) dispersing a silicon-based material and a first conductive agent in the dispersant solution to form a first suspension;
   3) homogenizing the first suspension by a homogenizer to obtain a homogenized first suspension;
   4) mixing a binder material with a second solvent to form a binder solution;
   5) dispersing a second conductive agent in the binder solution to form a second suspension;
   6) mixing the homogenized first suspension with the second suspension to form a third suspension; and
   7) mixing a carbon active material with the third suspension to form the anode slurry;
   wherein the particle size of the first conductive agent is smaller than the particle size of the second conductive agent; and
   wherein the silicon-based material is selected from the group consisting of Si, $SiO_x$, Si/C, $SiO_x$/C, Si/M, and combinations thereof, wherein each x is independently from 0 to 2; M is selected from an alkali metal, an alkaline-earth metal, a transition metal, a rare earth metal, or a combination thereof, and is not Si.

2. The method of claim 1, wherein the dispersant is selected from the group consisting of polyvinyl alcohol, polyethylene oxide, polypropylene oxide, polyvinyl pyrrolidone, polyanionic cellulose, carboxylmethyl cellulose, hydroxyethylcellulose, carboxymethyl hydroxyethyl cellulose, methyl cellulose, starch, pectin, polyacrylamide, gelatin, polyacrylic acid, and combinations thereof.

3. The method of claim 1, wherein the viscosity of the dispersant solution is from about 10 cps to about 2,000 cps.

4. The method of claim 1, wherein each of the first and second solvents is independently selected from the group consisting of water, ethanol, isopropanol, methanol, acetone, n-propanol, t-butanol, N-methyl-2-pyrrolidone, and combinations thereof.

5. The method of claim 1, wherein the particle size of the silicon-based material is from about 10 nm to about 800 nm.

6. The method of claim 1, wherein the first conductive agent is selected from the group consisting of carbon, carbon black, acetylene black, Super P, graphene, graphene nanoplatelets, carbon fibres, carbon nano-fibers, graphitized carbon flake, carbon tubes, carbon nanotubes, activated carbon, mesoporous carbon, and combinations thereof.

7. The method of claim 1, wherein the particle size of the first conductive agent is from about 20 nm to about 100 nm.

8. The method of claim 1, wherein the particle size distribution of the first suspension has a D10 value in a range from about 10 nm to about 100 nm, a D50 value in a range from about 30 nm to about 2 μm, and a D90 value in a range from about 70 nm to about 3 μm.

9. The method of claim 1, wherein the D90/D50 ratio of the particle size distribution of the first suspension is less than 2:1.

10. The method of claim 1, wherein the second conductive agent is selected from the group consisting of carbon, conductive graphite, vapor-grown carbon fiber, KS6, KS15, expanded graphite and combinations thereof.

11. The method of claim 1, wherein the particle size of the second conductive agent is from about 1 μm to about 10 μm.

12. The method of claim 1, wherein the carbon active material is selected from the group consisting of hard carbon, soft carbon, graphite, mesocarbon microbeads, and combinations thereof.

13. The method of claim 1, wherein the particle size of the carbon active material is from about 1 μm to about 20 μm.

14. The method of claim 1, wherein the ratio of the particle size of the second conductive agent to particle size of the first conductive agent is from about 20:1 to about 250:1.

15. The method of claim 1, wherein the weight ratio of the silicon-based material to the first conductive agent is from about 1.7:1 to about 5:1.

16. The method of claim 1, wherein the weight ratio of the first conductive agent to the second conductive agent is from about 1:1 to about 2:1.

17. The method of claim 1, wherein the amount of the silicon-based material is from about 1% to about 20% by weight, based on the total weight of the solid content in the anode slurry.

18. The method of claim 1, wherein the amount of the rust conductive agent and second conductive agent in the anode slurry is greater than or equal to 3% by weight, based on the total weight of solid content in the anode slurry.

19. The method of claim 1, wherein the anode slurry has a solid content from about 30% to about 65% by weight, based on the total weight of the anode slurry.

\* \* \* \* \*

UNITED STATES PATENT AND TRADEMARK OFFICE
CERTIFICATE OF CORRECTION

PATENT NO. : 11,502,288 B2
APPLICATION NO. : 16/314393
DATED : November 15, 2022
INVENTOR(S) : Kam Piu Ho et al.

It is certified that error appears in the above-identified patent and that said Letters Patent is hereby corrected as shown below:

In the Claims

Column 28, Lines 66 and 67, Claim 19, "the rust conductive agent" should read -- the first conductive agent --.

Signed and Sealed this
Twenty-first Day of February, 2023

Katherine Kelly Vidal
*Director of the United States Patent and Trademark Office*